Feb. 3, 1925.
R. MORRIS
MINIATURE TREE
Filed Jan. 10, 1924
1,525,250
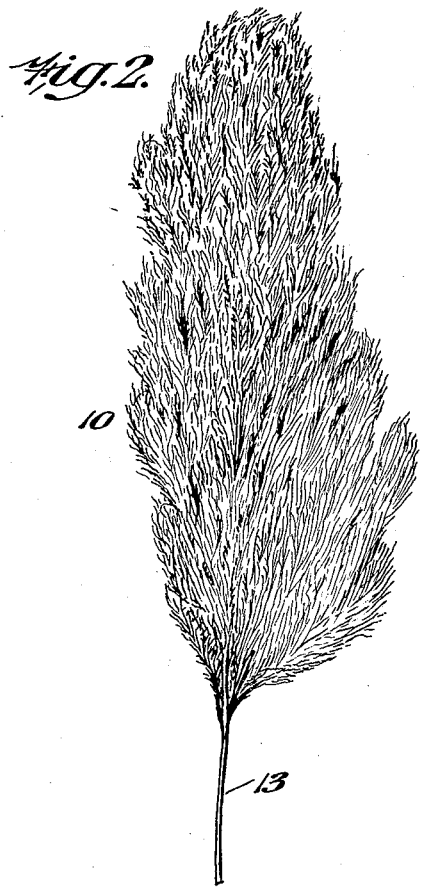
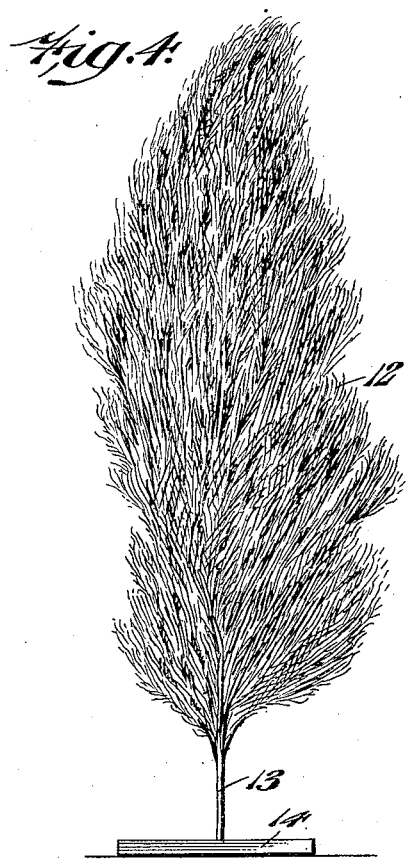
INVENTOR:
Robert Morris.
BY
Robert M. Barr.
ATTORNEY Patented Feb. 3, 1925.

1,525,250

UNITED STATES PATENT OFFICE.

ROBERT MORRIS, OF PHILADELPHIA, PENNSYLVANIA.

MINIATURE TREE.

Application filed January 10, 1924. Serial No. 685,402.

*To all whom it may concern:*

Be it known that I, ROBERT MORRIS, a citizen of the United States, and a resident of Philadelphia, county of Philadelphia, and State of Pennsylvania, have invented certain new and useful Improvements in Miniature Trees, of which the following is a specification.

The present invention relates to artificial trees, and has for some of its objects to provide a miniature tree which simulates in shape and appearance the foliage of a natural tree; to provide an imitation tree relatively small in size to serve as a decoration or a toy; to provide an improved miniature artificial tree which is economical to manufacture and in appearance has a life-like resemblance to a natural growing tree; to provide an improved method of manufacturing imitation trees; and to provide other improvements as will hereinafter appear.

In the accompanying drawings, Fig. 1 represents an elevation of a variety of grass or wild growth, the blooms or seed growth of which are employed in the manufacture of the present invention; Fig. 2 represents one of the blooms or plume-like forms of the grass prior to treatment and assembling as a miniature tree; Fig. 3 represents a detail of one of the feathery shoots of which the bloom is composed; Fig. 4 represents a side elevation of the miniature tree in its completed form.

Referring to the drawings, one form of the present invention comprises a flower or seed formation 10 of a species of reed grass 11, which are used as the body of the miniature tree. The grass or plant 11 shown in Fig. 1 is found in large quantities in certain localities, particularly in the lowlands where there is more or less moisture in the soil, though not necessarily of a swampy character. This grass develops a flower-like growth in midseason which is in the form of a feathery spike or plume, there being one of these spikes or plumes to each plant. When these plumes have matured, and before they go to seed, they are gathered in quantities, and sorted into sizes according to the tree sizes desired. After this they are dipped in a vat or tank containing a dye, preferably of a green color, to give the natural color of the foliage of a tree, and thereafter are removed and placed on drying boards. The dyed bloom 12 is shown in Fig. 4. After the dyed plumes have dried properly, the stem 13 of each is cut to a suitable length to give the desired height to the tree as a completed miniature article, and generally give about the proportions as to length as shown in Fig. 2. The completed dyed plumes 12 are then individually mounted on separate bases 14 of such a size as to support and maintain the tree standing erect when placed upon a level support. The tree then has the appearance as shown in Fig. 4, and its life-like appearance is due to the fact that the natural growth of the plume in a multiplicity of small feather-like shoots 15 gives the collective effect of the branches and leaves of a tree.

The present invention differs widely from imitation trees made of standards having sockets to receive twigs and branches, or trees made from dyed sponges in that such prior devices are crude in appearance and are so obviously distinguished from a natural tree effect as to render them worthless as a commercial article. In contrast thereto, the present invention provides a miniature artificial tree which so closely resembles the natural object as to deceive the most critical and in consequence it has gone into wide use for decorating purposes and the building of life-like scenes wherein trees and tree arrangements form an important part.

While in the foregoing a reed grass is referred to broadly, the specific type of grass preferred is either that of the variety *Phragmites phragmites*, or *Arundo phragmites*, or *Phragmites communis*, each of which lends itself particularly well to the carrying out of the present invention because of the characteristic silvery feathered plume which develops at a certain season of the year. This plume bears a strong resemblance on a small scale to the foliage of the ordinary tree, and this when treated in accordance with this invention completes the resemblance and forms a miniature article effectively simulating the appearance of a natural tree. When completed and assembled the artificial trees are used for various decorative purposes, such as place decorations for dinners, or to form parts of a miniature landscape, or for use by architects and gardeners to lay out a representation of a proposed estate or garden, or for ornamental purposes during the Christmas season.

Having now fully described my invention, what I claim is:—

1. An artificial tree comprising the cut, feathery plume of reed grass dyed to simulate the color of foliage, and a base for supporting said plume in an upright position.

2. An artificial tree comprising the cut, feathery plume of genus Phragmites dyed to simulate the color of foliage, and a base for supporting said plume in an upright position.

Signed at Philadelphia, county of Philadelphia, State of Pennsylvania, this 8th day of January, 1924.

ROBERT MORRIS.